United States Patent
Krasnov et al.

(10) Patent No.: US 10,450,224 B2
(45) Date of Patent: Oct. 22, 2019

(54) COATED ARTICLE WITH SEQUENTIALLY ACTIVATED LOW-E COATINGS, AND/OR METHOD OF MAKING THE SAME

(71) Applicants: Guardian Glass, LLC, Auburn Hills, MI (US); GUARDIAN EUROPE S.À R.L., Bertrange (LU)

(72) Inventors: Alexey Krasnov, Canton, MI (US); Herbert Lage, Luxembourg (LU); Jean-Marc Lemmer, Wincheringen (DE)

(73) Assignee: GUARDIAN GLASS, LLC, Auburn Hills, MI (US)

( * ) Notice: Subject to any disclaimer, the term of this patent is extended or adjusted under 35 U.S.C. 154(b) by 0 days.

(21) Appl. No.: 16/021,210

(22) Filed: Jun. 28, 2018

(65) Prior Publication Data
US 2018/0312429 A1 Nov. 1, 2018

Related U.S. Application Data

(63) Continuation of application No. 14/744,235, filed on Jun. 19, 2015, now Pat. No. 10,011,524.

(51) Int. Cl.
*C23C 14/00* (2006.01)
*C03C 17/36* (2006.01)
(Continued)

(52) U.S. Cl.
CPC .......... *C03C 17/3613* (2013.01); *C03C 17/36* (2013.01); *C03C 17/366* (2013.01);
(Continued)

(58) Field of Classification Search
USPC ........................ 428/434; 204/192.1; 427/553
See application file for complete search history.

(56) References Cited

U.S. PATENT DOCUMENTS

| 5,916,375 A | 6/1999 | Agui et al. |
| 8,173,937 B2 * | 5/2012 | Yokouchi ............ F27B 17/0025 219/411 |

(Continued)

FOREIGN PATENT DOCUMENTS

| EP | 1347468 | 9/2003 |
| WO | 2010/142926 | 12/2010 |

(Continued)

OTHER PUBLICATIONS

U.S. Appl. No. 14/744,235, filed Jun. 19, 2015, Krasnov et al.
(Continued)

*Primary Examiner* — Lauren R Colgan

(57) ABSTRACT

Certain example embodiments relate to coated articles with sequentially activated low-E coatings, and/or methods of making the same. In certain example embodiments, one or more infrared reflecting layers is/are activated via a non-equilibrium preconditioning activation that uses photons with specific frequencies/frequency ranges, followed by a more equilibrium thermal activation. The preconditioning activation aids in rearranging the silver atoms to energetically favorable positions, while helping to avoid their unwanted agglomeration. The more equilibrium thermal stage of activation aids in aligning the chemical potentials of the layers of the stack and in further densification of the preconditioned silver layer. Doing so, in turn, helps to reduce the likelihood of stresses building-up in the coating, the formation of point and dimensional defects, other unwanted efficiency-reducing phenomena, and/or the like. Advantageously, emissivity can be lowered to a value lower than that achievable using conventional thermal, flash, and laser scanning, approaches alone.

22 Claims, 6 Drawing Sheets

(51) Int. Cl.
*C03C 23/00* (2006.01)
*C03C 25/226* (2018.01)
*B32B 15/04* (2006.01)
*B32B 17/06* (2006.01)

(52) U.S. Cl.
CPC ...... *C03C 17/3626* (2013.01); *C03C 17/3639* (2013.01); *C03C 17/3644* (2013.01); *C03C 17/3652* (2013.01); *C03C 23/001* (2013.01); *C03C 23/007* (2013.01); *C03C 23/0015* (2013.01); *C03C 25/226* (2013.01); *C03C 2217/73* (2013.01); *C03C 2218/154* (2013.01)

(56) References Cited

U.S. PATENT DOCUMENTS

| | | | |
|---|---|---|---|
| 8,445,373 B2 | 5/2013 | Broadway et al. | |
| 10,011,524 B2 | 7/2018 | Krasnov et al. | |
| 10,060,180 B2* | 8/2018 | Burrows | C23C 14/086 |
| 2004/0071985 A1* | 4/2004 | Krisko | C03C 17/36 |
| | | | 428/434 |
| 2007/0235662 A1* | 10/2007 | Tien | H01L 21/67115 |
| | | | 250/453.11 |
| 2011/0248026 A1 | 10/2011 | Schroder et al. | |
| 2013/0320241 A1* | 12/2013 | Krasnov | C03C 17/36 |
| | | | 250/492.1 |
| 2014/0060574 A1* | 3/2014 | Wyse | B08B 7/00 |
| | | | 134/3 |
| 2014/0199496 A1* | 7/2014 | Gross | E04B 1/78 |
| | | | 427/553 |
| 2015/0146286 A1* | 5/2015 | Hagen | C03C 17/3435 |
| | | | 359/359 |
| 2016/0060948 A1* | 3/2016 | Burrows | C03C 17/3644 |
| | | | 428/34 |
| 2016/0368817 A1* | 12/2016 | Krasnov | C03C 17/3613 |

FOREIGN PATENT DOCUMENTS

| | | |
|---|---|---|
| WO | WO 2012/115850 | 8/2012 |
| WO | WO 2013/002983 | 1/2013 |
| WO | 2013/026817 | 2/2013 |
| WO | WO 2013/026819 | 2/2013 |
| WO | 2013/057428 | 4/2013 |
| WO | 2013/156721 | 10/2013 |

OTHER PUBLICATIONS

Morgan et al., "Annealing Effects on Opto-Electronic Properties of Sputtered and Thermally Evaporated Indium-Tin-Oxide Films," 1998, Thin Solid Films, 312, p. 268-272.

* cited by examiner

COATED ARTICLE WITH SEQUENTIALLY ACTIVATED LOW-E COATINGS, AND/OR METHOD OF MAKING THE SAME

This application is a divisional of application Ser. No. 14/744,235, filed Jun. 19, 2015 (now U.S. Pat. No. 10,011,514), the entire disclosure of which is hereby incorporated herein by reference in this application.

FIELD OF THE INVENTION

Certain example embodiments of this invention relate to coated articles including low-E coatings, and/or methods of making the same. More particularly, certain example embodiments relate to coated articles with sequentially activated low-E coatings, and/or methods of making the same. In certain example embodiments, one or more infrared reflecting layers is/are activated via a non-equilibrium preconditioning activation that uses photons with specific frequencies/frequency ranges, followed by a more equilibrium thermal activation.

BACKGROUND AND SUMMARY OF EXAMPLE EMBODIMENTS OF THE INVENTION

Coated articles are known in the art for use in residential and commercial window applications including, for example, architectural glazings, insulating glass (IG) window units, vacuum insulated glass (VIG) units, etc. Coated articles also are oftentimes used in vehicle windows, refrigerator/freezer doors, etc. It is known that in certain instances, it is desirable to heat treat (e.g., thermally temper, heat bend, and/or heat strengthen) such coated articles for purposes of tempering, bending, or the like.

In certain situations, designers of coated articles often strive for a combination of good selectivity, desirable visible transmission, low emissivity (or emittance), and low sheet resistance ($R_s$). Low-emissivity (low-E) and low sheet resistance characteristics permit such coated articles to block significant amounts of infrared (IR) radiation so as to reduce, for example, undesirable heating of vehicle or building interiors. More particularly, low-E coatings may oftentimes be used to control the amount of solar and mid-IR radiation transferred from and into building structures, vehicles, etc. Emissivity in this context thus refers generally to the ability to radiate heat in the form of longer-wave radiation. The lower the emissivity, the better the insulating properties of the coated glazing tend to be.

Low-E coatings typically involve a glass substrate supporting an IR reflecting layer that is sandwiched between one or more dielectric layers. It is not uncommon for some coated articles to include one, two, three, or four, IR reflecting layers, with each IR reflecting layer being separated by one or more dielectric layers, and with there being one or more dielectric layers provided below the lowest and above the upper IR reflective layers. Silver is one common IR reflecting layer used in low-E coatings.

Low-E coatings are typically deposited at room temperatures to reduce the likelihood of unwanted agglomeration in the silver layer. Agglomeration could be problematic from both functional and aesthetic standpoints. Unfortunately, however, the performance of such room-temperature deposited coatings is not optimal, with emissivity generally ranging between 0.035 and 0.040 for single-Ag coatings, and between 0.022 and 0.027 for double-Ag coatings.

To lower the emissivity, the coatings are often subjected to post-deposition thermal activation, with or without tempering (generally achieved by a forced quenching of the glass by air). Emissivity of thermally activated products oftentimes can range from 0.028 to 0.032 for single-Ag coatings, and from 0.019 to 0.023 for double-Ag coatings. Overexposure to thermal activation often results in the loss of film smoothness due to silver agglomeration before reaching the minimum emissivity possible. There also is oftentimes a trade-off between low-E performance and desired visual properties (e.g., in terms of visible transmission, etc.). It thus will be appreciated that there is room for performance improvements when it comes to activating low-E coatings.

Another currently available activation technique uses the exposure of a low-E coating to high-intensity flash light. Such radiative heating of the coating also results in reduced emissivity compared to the as-deposited coating. One concern with this approach, however, is that the light sources used in the industry typically are optimized for traditional recrystallization of amorphous silicon (a-Si) and operate primarily in the near infrared spectrum (e.g. in the 800-1200 nm range). Coincidently, these frequencies are mostly reflected by the Ag coatings, because they overlap with the plasma wavelength region of the Ag, caused by the oscillation of free electrons induced by the infrared. The oscillation, which repels the near-IR photons, gets stronger as the process of the activation progresses or the energy of the light increases. Emissivity of the flash-light activated films typically ranges from 0.030 to 0.034 for single-Ag coatings, and from 0.020 to 0.024 for double-Ag coatings. Thus, it once again will be appreciated that there is room for performance improvement when it comes to activating low-E coatings, especially with this somewhat difficult to implement approach.

One aspect of certain example embodiments relates to improving the emissivity of low-E coatings, e.g., using a two-stage approach for activating room-temperature deposited silver-based low-E coatings. In certain example embodiments, it is possible to achieve levels of emissivity lower than those attainable using conventional activation methods, such as tempering and flash treatments alone.

Another aspect of certain example embodiments relates to one or more infrared reflecting layers being activated via a non-equilibrium preconditioning activation that uses photons with specific frequencies/frequency ranges, followed by a more equilibrium thermal activation.

Another aspect of certain example embodiments relates to using a flash activation that aids in rearranging the silver atoms to energetically favorable positions while helping to avoid their unwanted agglomeration, followed by a thermal activation that aids in aligning the chemical potentials of the layers of the layer stack and in further densification of the preconditioned silver layer.

Still another example embodiment relates to applying a preconditioning flash activation after each IR reflecting layer is deposited, followed by a thermal activation after all IR reflecting layers have been deposited (e.g., once all layers in the layer stack have been deposited).

Still another example embodiment relates to applying a series of preconditioning flash activations after all IR reflecting layers have been deposited (e.g., once all layers in the layer stack have been deposited), with different flash characteristics being used for the different flashes in the series to in essence target the different IR reflecting layers, followed by a thermal activation.

Still another example embodiment relates to applying a series of preconditioning flash activations, with flash activation for the top IR reflecting layer(s) being performed using a flash source disposed above the coating and with flash activation for the bottom IR reflecting layer(s) being performed using a flash source disposed below the coating, followed by a thermal activation.

In certain example embodiments, a method of making a coated article including a multilayer thin film low-E coating supported by a glass substrate is provided. The low-E coating is formed on the substrate, with the low-E coating including at least first and second IR reflecting layers comprising silver, and with each of the first and second IR reflecting layers being sandwiched between one or more dielectric layers. The first IR reflecting layer is farther from the substrate than the second IR reflecting layer. Each of the IR reflecting layers is activated using a two-stage treatment. The first stage in the treatment preconditions the IR reflecting layers via flash light source exposure in at least first and second wavelength ranges, with the first wavelength range preferentially transmitting energy to the first IR reflecting layer and the second wavelength range preferentially transmitting energy to the second IR reflecting layer. The second stage in the treatment is a thermal treatment that is performed after all of the IR reflecting layers have been deposited, directly or indirectly, on the substrate. The second stage follows the first stage.

According to certain example embodiments, the first stage may be performed each time one of the IR reflecting layers is deposited, directly or indirectly, on the substrate, and prior to the subsequent IR reflecting layer being deposited. The first and second wavelength ranges may, for instance, be the same.

According to certain example embodiments, the first stage may be performed after all of the IR reflecting layers are deposited, e.g., with the first and second wavelength ranges being different from one another. For instance, the first wavelength range may have a maximum intensity in a first area proximate to a maximum absorptivity of the first IR reflecting layer, and the second wavelength range may have a maximum intensity in a second area that is remote from the first area and where the absorptivity of the first IR reflecting layer is less than one-half of its maximum.

According to certain example embodiments, the first stage may be performed after all of the IR reflecting layers are deposited, and the first IR reflecting layer may be preconditioned using a first light source provided over the substrate and the second IR reflecting layer may be preconditioned using a second light source provided under the substrate.

In certain example embodiments, a method of making a coated article including a multilayer thin film low-E coating supported by a glass substrate is provided. The low-E coating is formed on the substrate, with the low-E coating including a plurality of room temperature sputter deposited IR reflecting layers comprising silver, and with each of the IR reflecting layers being sandwiched between one or more dielectric layers. Each of the IR reflecting layers is activatable using a two-stage treatment. The first stage in the treatment includes light source exposures with photons in flash light profiles selected to preferentially transmit energy to the IR reflecting layers based on respective absorption levels thereof. The second stage in the treatment includes exposure to temperatures in excess of 400 degrees C. following formation of the IR reflecting layers. At least the first stage in the treatment is performed for each of the IR reflecting layers.

In certain example embodiments, a coated article is provided. The coated article includes a glass substrate, and a multilayer thin film low-E coating supported by the substrate. The low-E coating includes a plurality of room temperature sputter deposited IR reflecting layers comprising silver, with each of the IR reflecting layers being sandwiched between one or more dielectric layers, and with each of the IR reflecting layers having been activated using a two-stage treatment. The first stage in the treatment includes light source exposures with photons in flash light profiles selected to preferentially transmit energy to the IR reflecting layers based on respective absorption levels thereof. The second stage in the treatment includes exposure to temperatures in excess of 400 degrees C. following formation of the IR reflecting layers. The emissivity of the coating is 0.011 or lower.

In certain example embodiments, a system for forming a coated article is provided. A sputtering apparatus is controllable to form a multilayer thin film low-E coating on a glass substrate, with the coating comprising a plurality of room temperature sputter deposited IR reflecting layers comprising silver, and with each of the IR reflecting layers being sandwiched between one or more dielectric layers. At least one flash light source is controllable to precondition the IR reflecting layers through exposures to photons using flash light profiles selected to preferentially transmit energy to the IR reflecting layers based on respective absorption levels thereof. The flash light profiles use photon energies of 0.82-3.55 eV and are sufficient to rearrange silver atoms in the IR reflecting layers to more energetically favorable positions without also causing over-agglomeration. Emissivity of the coating is further lowerable through exposure to a subsequent thermal process. For instance, the system may include a furnace configured to heat the substrate with the preconditioned IR reflecting layers thereon to a temperature of at least 400 degrees C. and reduce emissivity of the coating to 0.011 or lower.

The above-described and/or other coated articles may be included in insulating glass (IG) units in certain example embodiments. Certain example embodiments relate to such IG units, and/or methods of making the same.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
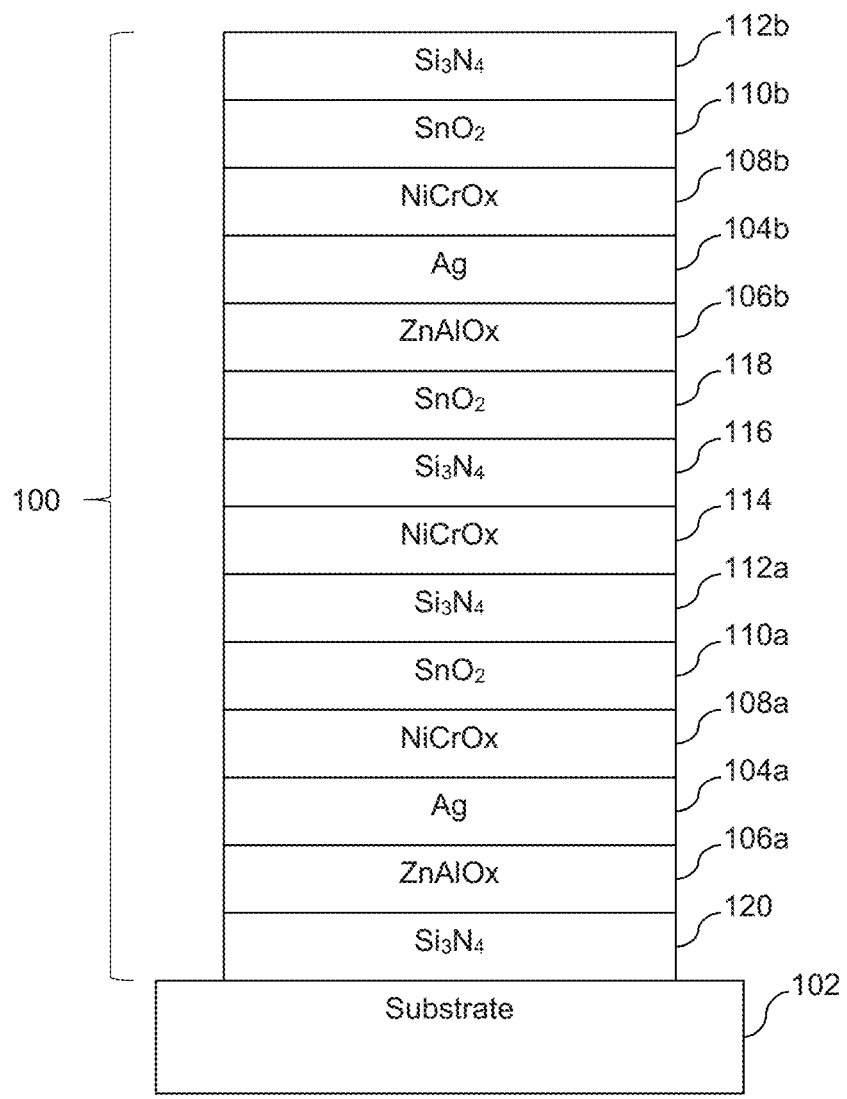
FIG. 1 is a cross-sectional view of a coated article including a low-emissivity (low-E) coating that can be activated by the two-stage activation approach of certain example embodiments.

Certain example embodiments relate to a two-stage approach for activating silver-based low-emissivity (low-E) coatings including, for example, room temperature deposited Ag-based low-E coatings. In certain example instances, it is possible to achieve levels of emissivity lower than those attainable using conventional activation methods, such as tempering and flash treatment alone. Certain example embodiments use non-equilibrium activation through the exposure of the Ag layer and/or one or more layers in its closest vicinity to photons with specific frequencies or frequency ranges, followed by a more equilibrium thermal activation of the entire layer stack. In certain example embodiments, ultraviolet (UV) specific frequencies or frequency ranges are used in the non-equilibrium activation.

The preconditioning activation of the coating by high-energy photons aids in rearranging the silver atoms to energetically favorable positions, while helping to avoid their unwanted agglomeration. As noted above, such agglomeration is a downside effect and tradeoff to be taken into account when optimizing a coating by thermal heating alone. The preconditioning activation of the coating by high-energy photons thus may be thought of as creating an intermediate activation state by using activation by photons with selective frequencies or frequency ranges favorable for the absorption by the Ag layer and/or one or more layers in its vicinity, with a low risk of causing Ag layer agglomeration.

This first stage of activation is followed by thermal activation, when different layers of the stack are brought to a more equilibrium state. The more equilibrium thermal stage of activation aids in aligning the chemical potentials of the layers of the stack and in further densification of the preconditioned silver layer. Doing so, in turn, helps to reduce the likelihood of stresses building-up in the coating, the formation of point and dimensional defects, other unwanted efficiency-reducing phenomena, and/or the like.

Depending on the wavelength or wavelength range of the irradiation, the light energy can be selectively absorbed by a certain layer or certain layers of a multi-layer stack. For instance, it is possible to select a wavelength or wavelength range of the irradiation that enables the light energy to be selectively absorbed by the seed layer, the capping layer, or both, and then delivered by means of acoustic phonons to the adjacent silver layer. Depending on the material composition of the seed and capping layers, the light source can be selected to have a strong UV component only, or a combination of the UV and visible or IR frequencies. The wavelength selection may be determined in connection with a consideration of the absorption edge of the members of the stack.

Certain example embodiments are advantageous in that they effectively decouple the beneficial effects of the rearrangement of the silver atoms from the equilibrium adjustment of the rest of the layer stack, thereby helping to reduce the downsides of these two processes. Certain example embodiments also allow for a more flexible tuning of the photon frequencies during the first stage of the activation, e.g., to better target the energy transfer from the source to the specific layer(s) of the stack. This benefit can become especially valuable for low-E products with different layer stack designs.

The resultant emissivity of the coating activated by flash and then by thermal treatment is lower compared to that achieved by flash only, by thermal only, and by thermal-then-flash treatment. Moreover, the inventors have observed that a thermal-then-flash treatment oftentimes does not result in an emissivity improvement compared to the thermal or flash treatments, alone. By contrast, the emissivity of flash-light activated films that are subsequently thermally treated has been found to range from 0.018 to 0.021 for single-Ag coatings, and from 0.011 to 0.013 for double-Ag coatings. In certain example embodiments, the emissivity of flash-light activated films that are subsequently thermally treated may be below 0.018 for single-Ag coatings, and below 0.011 for double-Ag coatings. In certain example embodiments, a 20% improvement in (lowering of) emissivity over conventional techniques can be realized for flash-activated coatings that are not subjected to a subsequent thermal activation. In certain example embodiments, the improvement in (lowering of) emissivity may be even greater when the two-stage flash-and-thermal activation approach described herein is used.

For a single-Ag coating, the flash activation may be applied immediately after the Ag-based layer is deposited, immediately after one or more capping layers are provided above the Ag-based layer, once all layers in the layer stack have been deposited, and/or at some other appropriate time. The thermal treatment may be provided once all layers in the layer stack have been deposited. As explained in greater detail below, there are further options when multiple IR reflecting layers are provided.

The flashes may be quick and persist for time periods on the order of mirco- or milliseconds. For instance, certain example embodiments may use flashes that persist 0.01-100 ms, more preferably 0.05-10 ms, and still more preferably 0.1-5 ms. In certain example embodiments, the flash stage of the activation treatment includes photons with energies greater than 0.82 eV. Preferably, photon energies for each flash are between 0.82 and 3.55 eV. In certain example embodiments, the thermal stage of the activation treatment includes a temperature of at least 400 degrees C. Preferably, the temperature is between 400 and 650 degrees C. The thermal stage preferably is 1-20 min., more preferably 5-10 min., in certain example embodiments. Pulse width, pulse intensity, and/or other variables can be used to change the flash intensity. By selecting a wavelength range appropriate for the coating, it is possible to ensure that the bulk of the heating goes to the coating as opposed to the substrate. By contrast, the thermal activation in a theoretical fully equilibrium state waits for the entire coated article to reach a given temperature. While this is possible with some coatings, it is not possible with all coatings. Thus, a quasi-equilibrium state may be sought after in connection with the thermal activation process. It will be appreciated, however, that because the entire coated article is being heated, the activation is more of an equilibrium activation than the flash activation.

Referring now more particularly to the drawings in which like reference numerals indicate like parts throughout the several views, FIG. 1 is a cross-sectional view of a coated article including a low-emissivity (low-E) coating that can be activated by the two-stage activation approach of certain example embodiments. The coated article of FIG. 1 includes a multi-layer coating 100 supported by a substrate (e.g., a glass substrate) 102, which may be rigid or flexible. Some or all of the layers in the multi-layer coating 100 may be formed by a physical vapor deposition technique such as sputtering or the like. In addition, some or all of the layers may be deposited at room temperature. As those skilled in the art will understand, "room temperature deposition" refers generally to cooler and not intentionally heated sputtering environments, e.g., where the temperature of the process is approximately (but not necessarily exactly) room temperature.

The coating 100 includes first and second Ag-based IR reflecting layers 104a and 104b. The first and second Ag-based IR reflecting layers 104a and 104b are supported by first and second seed layers 106a and 106b, which may comprise ZnOx, AlOx, ZnAlOx, and/or the like. Above the first and second Ag-based IR reflecting layers 104a and 104b are provided first and second capping layers 108a and 108b. These capping layers 108a and 108b may be partially or fully metallic in different example embodiments. In certain example embodiments, the capping layers 108a and 108b may comprise Ni, Cr, Ti, and/or the like, and they may be completely or partially oxidized in different example embodiments. In certain example embodiments, a layer comprising this material may be provided below (e.g., and in direct contact with) one or both of the IR reflecting layers 104a and 104b, together with or in place of the first and second seed layers 106a and 106b. Further dielectric layers may be provided in different example embodiments, e.g., to help protect the first and second Ag-based IR reflecting layers 104a and 104b, achieve desired optical properties, etc. For instance, first and second layers comprising tin oxide 110a and 110b are provided above the capping layers 108a and 108b in the FIG. 1 example, and first and second silicon-inclusive layers 112a and 112b (which may help reduce the incidence of oxygen migration through the stack in some instances) are provided above the first and second layers comprising tin oxide 110a and 110b in the FIG. 1 example. The silicon-inclusive layers 112a and 112b may be oxided and/or nitrided in different example embodiments. Aluminum also may be included in one or more of these layers. These layers may be graded in terms of oxygen content in certain example embodiments. As shown in FIG. 1, a thin layer 114 comprising Ni, Cr, Ti, and/or the like that may be completely or partially oxidized in different example embodiments is provided between the first silicon-inclusive layer 112a and another silicon-inclusive layer 116, e.g., as a breaker layer. Another layer comprising tin oxide 118 is provided above that other silicon-inclusive layer 116 and just below the upper silver-inclusive sub-stack that includes layers 106b/104b/108b. Another silicon inclusive layer 120 may be provided on the substrate 102, and it may aid in blocking the migration of oxygen, sodium from the substrate 102, and/or the like.

In certain example embodiments, any layers provided over the upper targeted layer(s) are essentially non-absorbing. For instance, the uppermost dielectrics above the capping layer preferably have less than 1% optical absorption, more preferably less than 0.1% optical absorption, in a wavelength range of 200-1500 nm, more preferably 300-1200 nm (or any sub-range thereof), in which the pulses are to be delivered. Incoherent electromagnetic (EM) radiation may be directly and/or indirectly absorbed by the Ag-based layers, and the EM radiation may be provided using a flash light operable in the above-mentioned or other wavelength range. It will be appreciated that the light absorption in the Ag-based layers result in silver crystallization and a related drop in emissivity of the overall layer stacks.

Example layer thickness ranges for the FIG. 1 layer stack are provided in the following table. It will be appreciated that the visible transmission, emissivity, and other properties may vary from example to example.

| Layer | Example A Thickness Range (Å) | Example B Thickness Range (Å) | Example C Thickness Range (Å) | Example D Thickness Range (Å) |
|---|---|---|---|---|
| $Si_3N_4$ | 189-231 | 189-231 | 189-231 | 194-238 |
| $SnO_2$ | 127-157 | 144-176 | 130-160 | 90-112 |
| NiCrOx | 22-28 | 22-28 | 22-27.5 | 35-43 |
| Ag | 174-214 | 151-185 | 137-169 | 134-164 |
| ZnAlOx | 72-88 | 90-110 | 90-110 | 185-227 |
| $SnO_2$ | 72-88 | 79-97 | 60-74 | 162-198 |
| $Si_3N_4$ | 135-167 | 108-132 | 108-132 | 64-80 |
| NiCr | 120-148 | 54-68 | 9-13 | 13-17 |
| $Si_3N_4$ | 108-132 | 108-132 | 108-132 | 64-80 |
| $SnO_2$ | 477-583 | 455-557 | 442-542 | 324-398 |
| NiCrOx | 22-28 | 22-28 | 22-28 | 35-43 |
| Ag | 68-84 | 63-77 | 67-83 | 81-101 |
| ZnAlOx | 90-110 | 90-110 | 90-110 | 151-1858 |
| $Si_3N_4$ | 231-283 | 210-258 | 192-236 | 169-207 |
| GLASS | N/A | N/A | N/A | N/A |

Figure 2A:
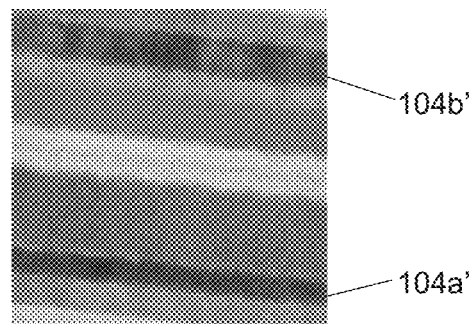
FIGS. 2A-2C are SEM images showing what happens when the FIG. 1 example coated article is activated with a thermal process, a one-time flash process, and laser scanning.
Figure 2B:
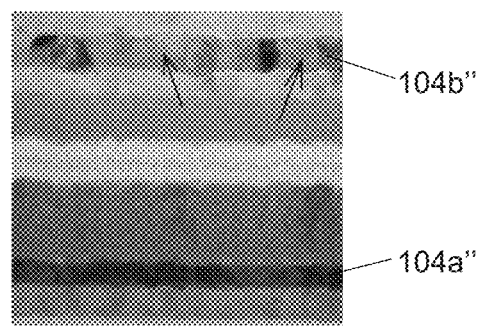
Figure 2C:
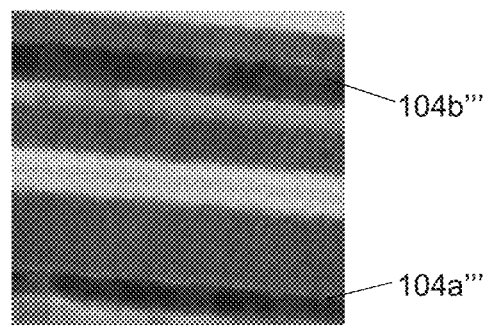

FIGS. 2A-2C are SEM images showing what happens when the FIG. 1 example (with Example D thickness ranges) coated article is activated with a thermal process, a one-time flash process, and laser scanning. As can be seen in FIG. 2A, silver grain growth in lower and upper Ag-based layers 104a' and 104b' is fairly distinct, showing "pretty good" activation for these layers using a thermal-only process.

As can be seen in FIG. 2B, silver grain growth in the upper Ag-based layer 104b" is excellent when a one-flash approach is used. The arrows added to this image help show distinctive grain growth. Unfortunately, however, the lower Ag-based layer 104a" is barely activated at all. Indeed, it is difficult to discern individual grains or the like, as the layer is quite black when viewed in this way.

FIG. 2C shows that scanning with an IR laser produces no measurable activation for the bottom and top Ag-based layers 104a''' and 104b'''.

Figure 3:
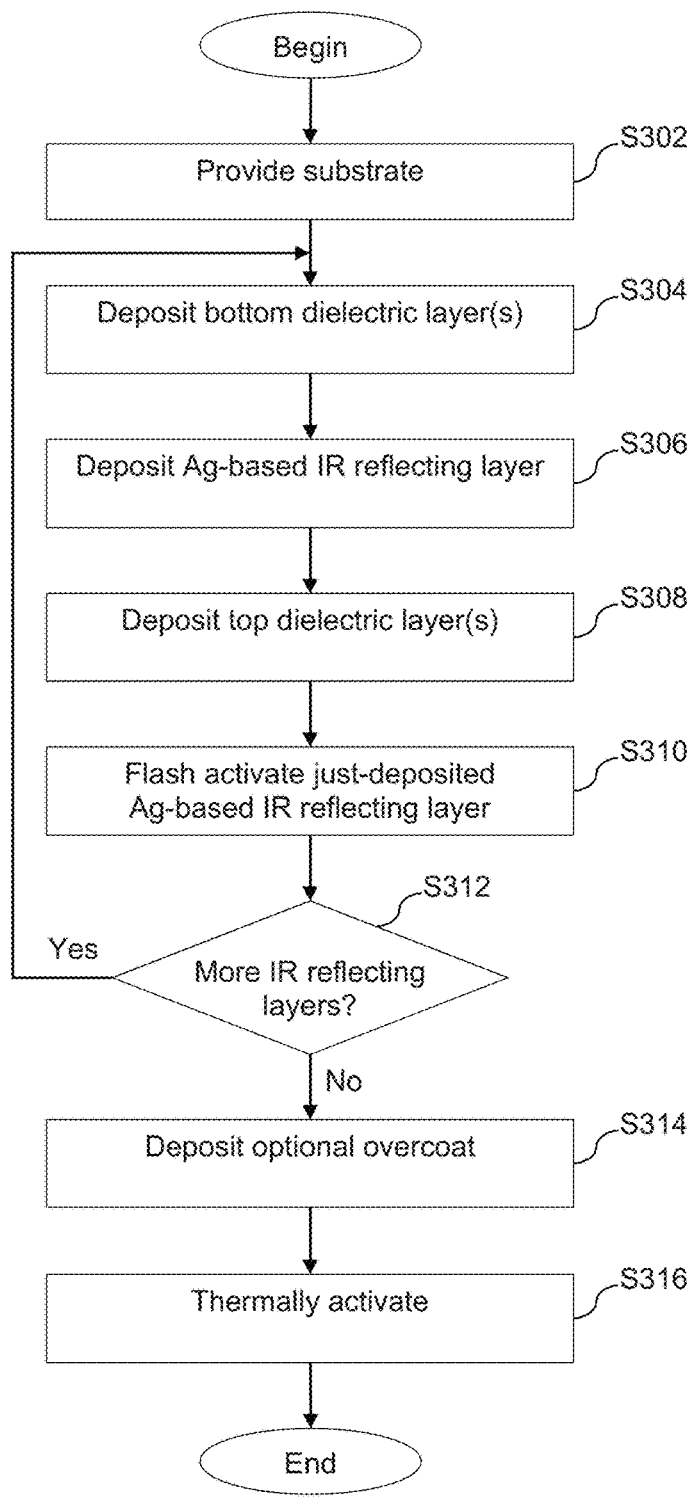
FIG. 3 is a flowchart showing a first example technique for a two-stage activation approach, in accordance with certain example embodiments.

FIG. 3 is a flowchart showing a first example technique for a two-stage activation approach, in accordance with certain example embodiments. A substrate is provided in step S302. One or more bottom dielectric layers are deposited thereon in step S304. These layers may be sodium migration blocking layers, layers useful for optics of the overall layer stack, one or more seed layers for the IR reflecting layer, etc. In step S306, the first IR Reflective layer (which may be a silver-based IR reflecting layer) is deposited on the bottom dielectric layer(s). One or more top dielectric layers is/are provided over the IR Reflective layer in step S308. These layers may include capping layers, optical breaker layers, and/or the like. In step S310, the just-deposited AG-based IR reflecting layer is flash activated. As implied in FIG. 3, the flash treatment may be provided after the dielectric layer(s) is/are provided over the Ag-based IR reflecting layer, e.g., so as to help protect it.

If there are more IR reflective layers to be deposited (e.g., as determined in step S312), then steps S304, S306, S308, and S310, are performed again. It will be appreciated that this loop may be repeated for coatings with two, three, four, or other numbers of IR reflecting layers. Once all IR reflecting layers are deposited, an optional overcoat may be provided in step S314. The overcoat may be a layer including Si, Zr, and/or the like. Thermal activation takes place in step S316, e.g., on the complete coated article. It will be appreciated that the thermal activation may take place in line (e.g., immediately following the deposition process), once shipped to a fabricator or manufacturer, after being stored, or at some other time.

It will be appreciated that FIG. 3 represents an approach in which a separate flash activation is performed for a given IR reflecting layer before the next IR reflecting layer is deposited on the substrate. Thus, there is a flash after each IR reflecting layer is deposited. Certain example embodiments may use common flash parameters for the successive flashes. However, it will be appreciated that care should be taken to avoid residual heating of the substrate, e.g., via too many flashes performed too quickly, etc. Care also should be taken to ensure that the IR reflecting layer being flash activated absorbs most, substantially all, or all of the photons, e.g., to help protect any underlying IR reflecting layer(s) that could be damaged by excess flash activation. For example, it would be desirable to select flash parameters that cause a flash to be generated that is absorbed by the layer being treated and without causing an excess of agglomeration or the like in any underlying IR reflecting layer(s).

Figure 4:
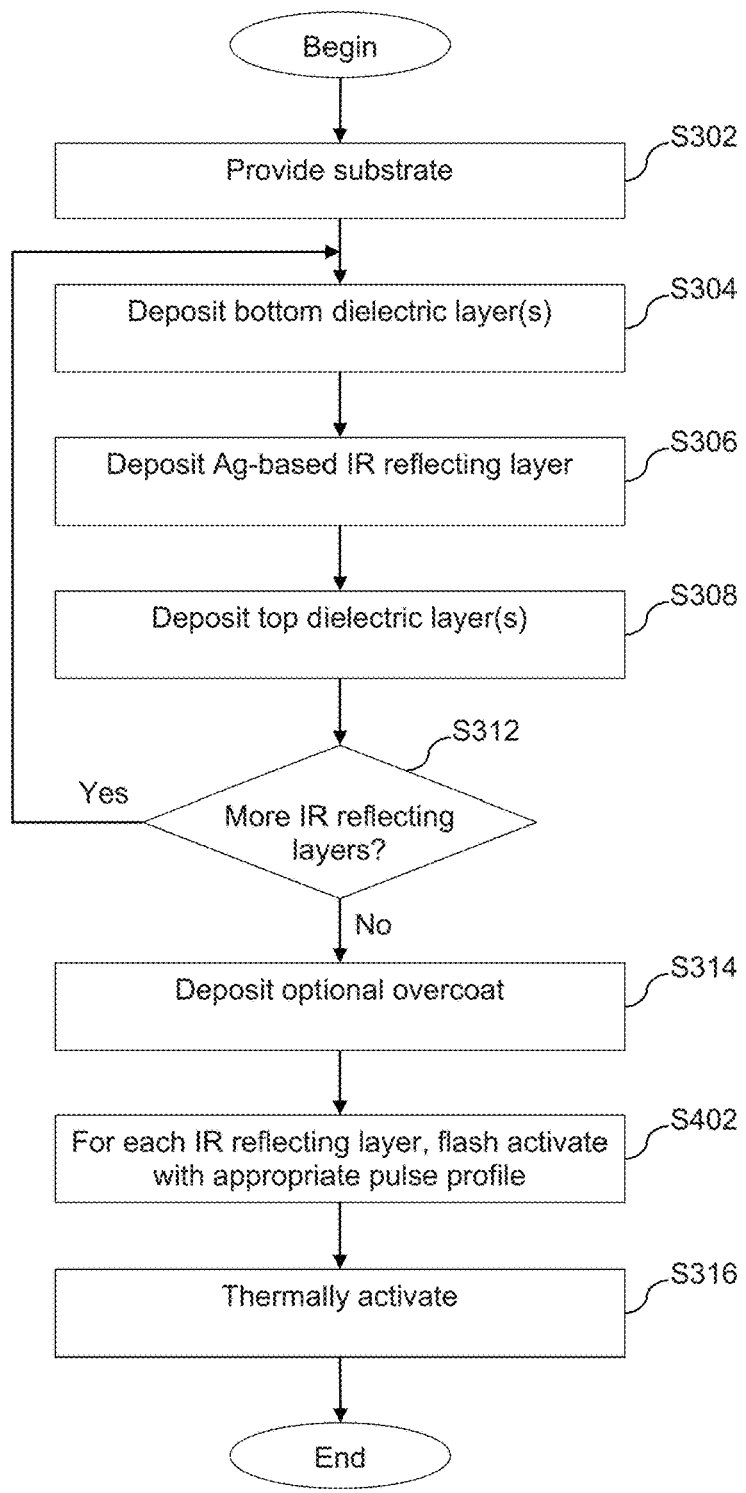
FIG. 4 is a flowchart showing a second example technique for a two-stage activation approach, in accordance with certain example embodiments.

FIG. 4 is a flowchart showing a second example technique for a two-stage activation approach, in accordance with certain example embodiments. FIG. 4 is similar to FIG. 3. However, as can be seen from FIG. 4, step S310 is absent from the loop including steps S304, S306, and S308. Instead of a flash after each IR reflecting layer is deposited, the FIG. 4 flowchart shows flash activation with an appropriate pulse profile for each IR reflecting layer in step S402 being performed after all IR reflecting layers are deposited and before thermal activation in step S316. Flash pulses or sub-pulses target the individual IR reflecting layers in the stack. This is accomplished by selecting an appropriate pulse or sub-pulse profile for the different IR reflecting layers in the stack.

One way that the different IR reflecting layers can be targeted is by varying the wavelengths or wavelength ranges of the pulses or sub-pulses in the flash(es). Profiles for the pulses can be developed, for example, by examining the absorption of the layers vs. different wavelengths or wavelength ranges. It is possible to select pulse profiles that are absorbed to different extents at the different layers. For instance, in the double-Ag low-E coating shown in FIG. 1, it is possible to select a first profile for a pulse that is significantly absorbed at the upper Ag-based layer 104b (and thus does not reach the lower Ag-based layer 104a), while also selecting a second profile that is not significantly absorbed at the upper Ag-based layer 104b but that is significantly absorbed at the lower Ag-based layer 104a.

Figure 5:
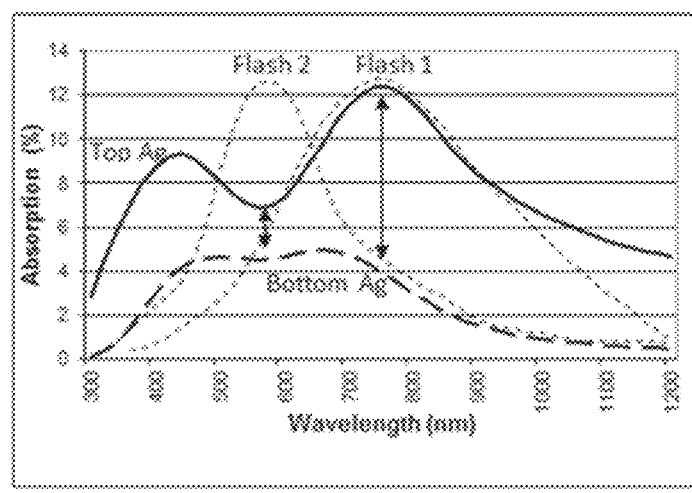
FIG. 5 is a graph plotting absorption percentage vs. wavelength for the FIG. 1 example coated article.

FIG. 5 and the following description show how such profiles can be developed. That is, FIG. 5 is a graph plotting absorption percentage vs. wavelength for the FIG. 1 example coated article (with Example D thickness ranges). More particularly, the solid line shows the top silver-based layer's susceptibility to radiation, and the long-dashed line shows the bottom silver-based layer's susceptibility to radiation. The dotted lines show characteristics of example flashes that may be used to flash-activate these coatings. As can be seen from FIG. 5, the first flash targets the top silver-based layer basically at or proximate to the most susceptible region of the top silver-based layer. The second flash targets the bottom silver-based layer at or proximate to one of its very susceptible regions. However, that region is a region where the top silver-based layer is not as susceptible to radiation. Thus, by characterizing the susceptibility to radiation of the different silver-based layers in a layer stack (e.g., in terms of percent absorption by wavelength), it is possible to select flash wavelength profiles that are advantageous in terms of activating the various layers while also reducing the likelihood of over-activation (including, for example, reduction of sheet resistance and/or emissivity to 0, over-agglomeration, increased layer roughness, etc.).

The inventors have observed that the absorption ratio of the top to the bottom Ag-based layer is about 2.6 for the FIG. 1 example (with Example D thickness ranges). This characterization approach can be used for different layer stacks that have the same or a different number of IR reflecting layers. For instance, in an example triple-silver embodiment similar to that shown in FIG. 1 (with Example D thickness ranges), the inventors have found a ratio of about 5.2:2:1. Here again, the ratio between the top and the second Ag is about 2.6. It is expected that these ratios, within approximate ranges of +/−10% for instance, will be workable for a variety of different double- and triple-silver embodiments (e.g., that have the same or similar layer stacks).

As shown in FIG. 5, the two silver-based IR reflecting layers are activated with at least two sub-flashes, the first flash having a maximum intensity in the spectral range of 700-900 nm to be preferentially absorbed by the top silver-based IR reflecting layer, and the second flash having a maximum intensity in the spectral range of 600-700 nm (or 550-650 nm) to be preferentially absorbed by the second silver-based IR reflecting layer. A layer stack with three silver-based IR reflecting layers may be activated with at least three sub-flashes, the first flash having a maximum intensity in the spectral range of 700-900 nm to be preferentially absorbed by the top silver-based IR reflecting layer, the second flash having a maximum intensity in the spectral range of 600-700 nm (or 550-650 nm) to be preferentially absorbed by the middle silver-based IR reflecting layer, and the third flash having a maximum intensity in the spectral range of 400-600 nm to be preferentially absorbed by the bottom silver-based IR reflecting layer.

Sequential flash light pulses in these and/or other different spectral regions may be formed by time-separated sub-pulses of different waveforms in certain example embodiments. In certain example embodiments, sequential flash light pulses in these and/or other different spectral regions may be formed by separate flash bulbs emitting light of different spectra. They may in some instances be positioned back-to-back in a light bulb assembly. In certain example embodiments, sequential flash light pulses in these and/or other different spectral regions may be formed by separate flash bulbs with the aid of optical filters.

The following tables provide sheet resistance (R, in ohms/square), emissivity, g-value, and visible transmission (Tvis) measurements for the FIG. 1 coated article (with Example D thickness ranges) in as-deposited, thermally activated, flash activated, and two-step flash and thermal activated states. (As is known in the art, a g-value is a coefficient that measures the solar energy transmittance of an article and sometimes also is referred to as the Solar Factor of that article.) The two-step flash and thermal activated state was reached using the FIG. 4 example approach.

| Performance in As-Deposited State | | | |
| --- | --- | --- | --- |
| R | Emissivity | g-value | Tvis |
| 2.03 | 0.0251 | 42.8 | 71.4 |

| Performance in Thermally Activated State | | | |
| --- | --- | --- | --- |
| R | Emissivity | g-value | Tvis |
| 1.83 | 0.0222 | 44.3 | 73.9 |

| Performance in Flash Activated State | | | |
| --- | --- | --- | --- |
| R | Emissivity | g-value | Tvis |
| 1.54 | 0.019 | 43.7 | 72.5 |

| Performance in Two-Step Thermal and Flash Activated State | | | |
| --- | --- | --- | --- |
| R | Emissivity | g-value | Tvis |
| 1.81 | 0.011 | 44.4 | 73.7 |

As can be seen from the tables above, the flash activated state provides a marked reduction in emissivity, while maintaining good visible transmission. Indeed, a 14.4% reduction in emissivity compared to that reached in the thermally activated state is achieved while visible transmission is between that obtained in the as-deposited and thermally activated states. The coated article subjected to the two-step activation approach of certain example embodiments, however, has a 50% reduction in emissivity compared to that reached in the thermally activated state with comparable visible transmission.

Figure 6:
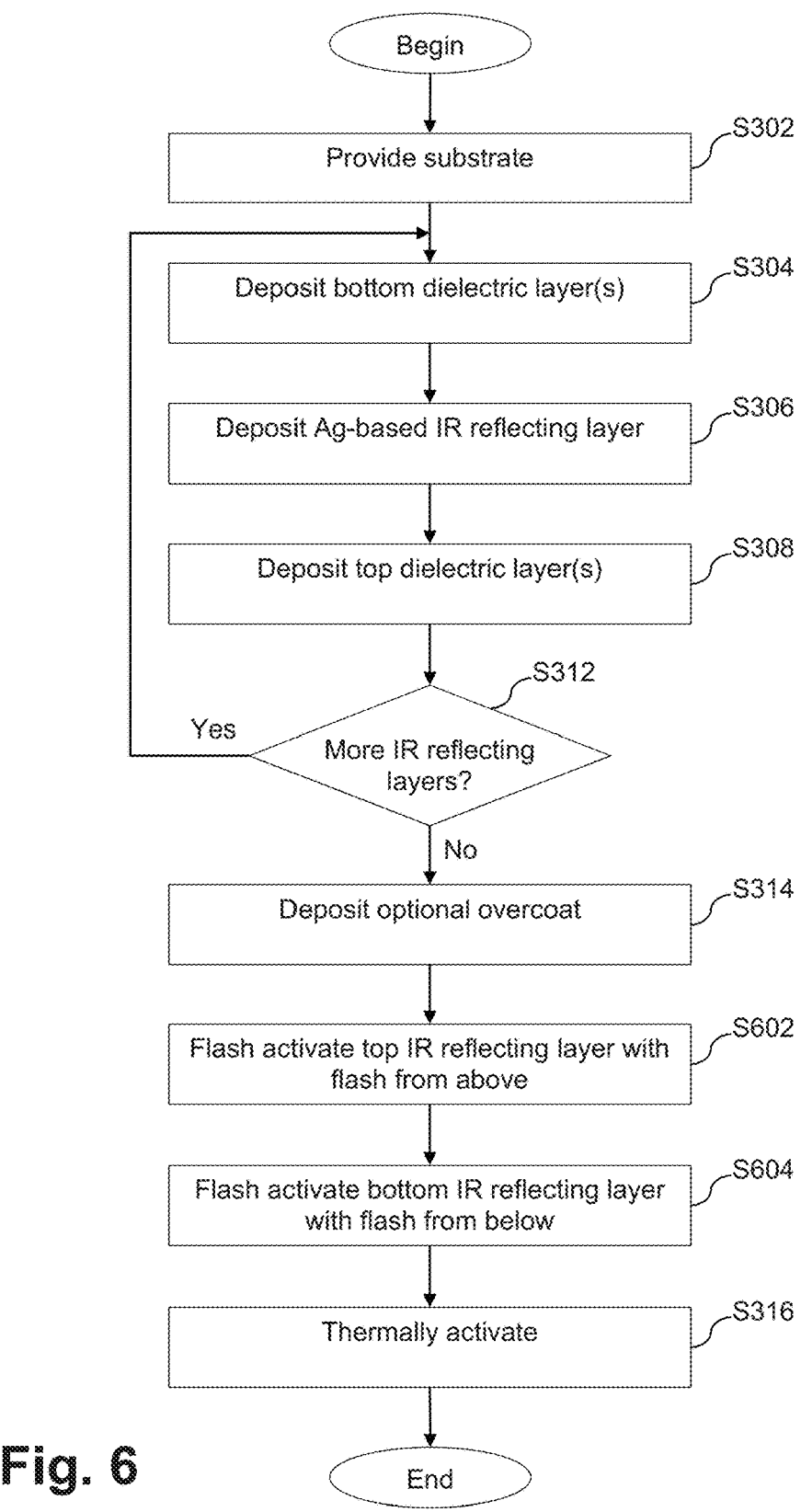
FIG. 6 is a flowchart showing a third example technique for a two-stage activation approach, in accordance with certain example embodiments.

FIG. 6 is a flowchart showing a third example technique for a two-stage activation approach, in accordance with certain example embodiments. FIG. 6 also is similar to FIG. 3. However, once again, as can be seen from FIG. 6, step S310 is absent from the loop including steps S304, S306, and S308. Instead of a flash after each IR reflecting layer is deposited, the FIG. 6 flowchart shows flash activation of the top and bottom IR reflecting layers in steps S602 and S604 being performed after all IR reflecting layers are deposited and before thermal activation in step S316. It will be appreciated that these activations may take place concurrently, at different times, etc.

The same or similar profiles may be used for each of the IR reflecting layers to be activated. For instance, it might be desirable to use different pulse profiles that account for the content of the substrate as opposed to the content of the overlying thin film layers, etc., which could impact how the pulse(s) are absorbed by the top and bottom IR reflecting layers.

It will be appreciated that the example flash light wavelength, intensity, power, and/or other values described above may be used in connection with the approaches shown in FIGS. 3, 4, and 6.

Although three example approaches have been set out in detail above, it will be appreciated that they may be combined in different combinations, sub-combinations, and combinations of sub-combinations, e.g., depending on the coating, the equipment available, the ease with which a profile can be developed, the efficacy of developed profiles, etc. In other words, if there are "hard to reach" interior IR reflecting layers, if it is difficult to activate exterior IR reflecting layers without also affecting interior layers, etc., different aspects of the approaches outlined in connection with FIGS. 3, 4, and 6, may be used. For instance, aspects from the approaches outlined above can be used to activate two IR reflecting layers from the top and one from the bottom (e.g., using the FIG. 3 approach from under the substrate and the FIG. 4 approach from above the substrate), or vice versa (e.g., using the FIG. 3 approach from under the substrate and the FIG. 4 approach from above the substrate). As another example, in a low-E coating that includes four IR reflecting layers, two layers may be activated from the top and two may be activated from the bottom (e.g., by effectively combining the approaches of FIGS. 4 and 6). As another example involving low-E coatings with three or four IR reflecting layers, the middle one or two IR reflecting layers may be activated as they are deposited (e.g., using the FIG. 3 approach), and the top and bottom IR reflecting layers may be activated at the end (e.g., using the FIG. 6 approach). In still another example, in a low-E coating with four IR reflecting layers, it is possible to activate the first two IR reflecting layers as they are deposited (e.g., using the FIG. 3 approach), and activate the top two IR reflecting layers using two different pulse profiles (e.g., using the FIG. 4 approach). Still other combinations are possible and are contemplated herein.

It will be appreciated that coated articles made by the techniques described herein also are contemplated. Similarly, systems for making such coated articles and/or for performing the techniques described herein also are contemplated. For instance, a system may include a sputtering apparatus controllable to form a multilayer thin film low-E coating on a glass substrate, with the coating comprising a plurality of room temperature sputter deposited IR reflecting layers comprising silver, and with each of the IR reflecting layers being sandwiched between one or more dielectric layers. At least one flash light source is controllable to precondition the IR reflecting layers through exposures to photons using flash light profiles selected to preferentially transmit energy to the IR reflecting layers based on respective absorption levels thereof. The flash light profiles use photon energies of 0.82-3.55 eV and are sufficient to rearrange silver atoms in the IR reflecting layers to more energetically favorable positions without also causing over-agglomeration. Emissivity of the coating is further lowerable through exposure to a subsequent thermal process. For instance, the system may include a furnace configured to heat the substrate with the preconditioned IR reflecting layers thereon to a temperature of at least 400 degrees C. and reduce emissivity of the coating to 0.011 or lower.

Although certain example embodiments have been described in connection with the FIG. 1 example low-E coating, it will be appreciated that the techniques used herein may be used in connection with any low-E coating. An example single-silver layer coating that may benefit from the example techniques disclosed herein is described in the table below:

| Layer | Example A Thickness Range (Å) |
|---|---|
| $Si_3N_4$ | 151-185 |
| ZnAlOx | 162-198 |
| ZnSnO | 72-88 |
| $TiO_2$ | 55-69 |
| NiCrOx | 26-32 |
| Ag | 91-113 |
| ZnAlOx | 92-114 |
| $TiO_2$ | 246-302 |
| GLASS | N/A |

Moreover, although certain example embodiments have been described as including Ag-based IR reflecting layers, the example techniques described herein may be used for IR reflecting layers that are based on other materials such as, for example, ITO or the like. Similarly, although certain example embodiments are described in connection with room temperature deposition techniques, the example embodiments described herein may be used in connection with layer stacks formed in other ways (e.g., layer stacks formed using non-room temperature sputtering, etc.).

Certain example embodiments have been described as including layers that are "deposited" on a substrate. Deposition may include sputtering and/or any other physical vapor deposition process. It will be appreciated that some or all of the layers in a given layer stack may be deposited (e.g., using sputtering or the like), or formed in some other way. For instance, certain example embodiments may form dielectric layers using a non-sputtering technique, sputter deposit IR reflecting layers, and form further dielectric layers using the same or different non-sputtering technique.

The terms "heat treatment" and "heat treating" as used herein mean heating the article to a temperature sufficient to achieve thermal tempering and/or heat strengthening of the glass-inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, up to about 10 minutes, up to 15 minutes, etc., in certain example embodiments.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

In certain example embodiments, a method of making a coated article including a multilayer thin film low-emissivity coating supported by a glass substrate is provided. The low-E coating is formed on the substrate, with the low-E coating including at least first and second infrared reflecting layers comprising silver, with each of the first and second IR reflecting layers being sandwiched between one or more dielectric layers, and with the first IR reflecting layer being farther from the substrate than the second IR reflecting layer. Each of the IR reflecting layers is activated using a two-stage treatment. The first stage in the treatment preconditions the IR reflecting layers via flash light source exposure in at least first and second wavelength ranges, with the first wavelength range preferentially transmitting energy to the first IR reflecting layer and the second wavelength range preferentially transmitting energy to the second IR reflecting layer. The second stage in the treatment is a thermal treatment that is performed after all of the IR reflecting layers have been deposited, directly or indirectly, on the substrate, with the second stage following the first stage.

In addition to the features of the previous paragraph, in certain example embodiments, the first stage in the treatment may include photons with energies of 0.82-3.55 eV.

In addition to the features of either of the two previous paragraphs, in certain example embodiments, the second stage in the treatment may include a temperature of 400-650 degrees C.

In addition to the features of any of the three previous paragraphs, in certain example embodiments, the emissivity of the coating, following the two-stage treatment, may be 0.011 or lower.

In addition to the features of any of the four previous paragraphs, in certain example embodiments, first and second seed layers may be provided below and contacting the first and second IR reflecting layers, respectively; and/or first and second capping layers may be provided over and contacting the first and second IR reflecting layers, respectively.

In addition to the features of the previous paragraph, in certain example embodiments, photons in the first wavelength range may preferentially transmit energy to the first seed layer, the first IR reflecting layer, and/or the first capping layer; and photons in the second wavelength range may preferentially transmit energy to the second seed layer, the second IR reflecting layer, and/or the second capping layer.

In addition to the features of either of the two previous paragraphs, in certain example embodiments, light energy in the first wavelength range may be preferentially absorbed by the first seed layer and/or the first capping layer, and is may be via acoustic photons to the first IR reflecting layer; and light energy in the second wavelength range may be preferentially absorbed by the second seed layer and/or the capping layer, and may be delivered via acoustic photons to the second IR reflecting layer.

In addition to the features of any of the three previous paragraphs, in certain example embodiments, the first and second seed layers may each comprise Zn and the first and second capping layers may each comprise Ni, Ti, and/or Cr.

In addition to the features of any of the eight previous paragraphs, in certain example embodiments, the preconditioning may include rearranging silver atoms in the first and second IR reflecting layers to more energetically favorable positions; and the thermal treatment may align chemical potentials of at least some layers in the layer stack and further densities the preconditioned first and second IR reflecting layers.

In addition to the features of any of the nine previous paragraphs, in certain example embodiments, and as a first alternative, the first stage may be performed each time one of the IR reflecting layers is deposited, directly or indirectly, on the substrate, and prior to the subsequent IR reflecting layer being deposited. Alternatively, in addition to the features of any of the nine previous paragraphs, in certain example embodiments, and as a second alternative, the first stage may be performed after all of the IR reflecting layers are deposited, with the first and second wavelength ranges being different from one another. Alternatively, in addition to the features of any of the nine previous paragraphs, in certain example embodiments, and as a third alternative, the first stage may be performed after all of the IR reflecting layers are deposited, and the first IR reflecting layer may be preconditioned using a first light source provided over the substrate and the second IR reflecting layer may be preconditioned using a second light source provided under the substrate.

In certain example embodiments, and optionally with the first alternative, the first and second wavelength ranges may be the same. In certain example embodiments, and optionally with the first alternative, the preconditioning of each of the IR reflecting layers may be performed after the respective IR reflecting layer is covered with the one or more dielectric layers.

In certain example embodiments, and optionally with the second alternative, the first wavelength range may have a maximum intensity in a first area proximate to a maximum absorptivity of the first IR reflecting layer and the second wavelength range may have a maximum intensity in a second area that is remote from the first area and where the absorptivity of the first IR reflecting layer is less than one-half of its maximum. In certain example embodiments, and optionally with the second alternative, the first wavelength range may have a maximum intensity in the 700-900 nm spectral range and the second wavelength range may have a maximum intensity in the 600-700 nm spectral range. In certain example embodiments, and optionally with the second alternative, the low-E may further include a third IR reflecting layer comprising silver, the third IR reflecting layer also being sandwiched between one or more dielectric layers, the third IR reflecting layer being farther from the substrate than the first IR reflecting layer, and the first stage further may include flash light source exposure with a third wavelength range that preferentially transmits energy to the third IR reflecting layer. In certain example embodiments, and optionally with the second alternative, the first, second, and third wavelength ranges may all be different from one another and have respective maximum intensities in the 600-700 nm, 400-600 nm, and 700-900 nm spectral ranges. In certain example embodiments, and optionally with the second alternative, the flash light source exposures that generate the first and second wavelength ranges may be formed by time-separated sub-pulses of different waveforms. In certain example embodiments, and optionally with the second alternative, the flash light source exposures that generate the first and second wavelength ranges may be formed by different flash bulbs.

In addition to the features of any of the 12 previous paragraphs, in certain example embodiments, the low-E coating may be formed in whole or in part by room temperature sputtering.

In certain example embodiments, a method of making a coated article including a multilayer thin film low-emissivity coating supported by a glass substrate is provided. The low-E coating is formed on the substrate, with the low-E coating including a plurality of room temperature sputter deposited infrared reflecting layers comprising silver, and with each of the IR reflecting layers being sandwiched between one or more dielectric layers. Each of the IR reflecting layers is activatable using a two-stage treatment. The first stage in the treatment includes light source exposures with photons in flash light profiles selected to preferentially transmit energy to the IR reflecting layers based on respective absorption levels thereof, and the second stage in the treatment includes exposure to temperatures in excess of 400 degrees C. following formation of the IR reflecting layers. At least the first stage in the treatment is performed for each of the IR reflecting layers.

In addition to the features of the previous paragraph, in certain example embodiments, the first stage may be performed each time one of the IR reflecting layers is deposited, directly or indirectly, on the substrate, and prior to the subsequent IR reflecting layer being deposited. Alternatively, in addition to the features of the previous paragraph, in certain example embodiments, the first stage may be performed after all of the IR reflecting layers are deposited, with the IR reflecting layers having energy preferentially transmitted thereto from light source exposures with different flash light profiles. Alternatively, in addition to the features of the previous paragraph, in certain example embodiments, the first stage may be performed after all of the IR reflecting layers are deposited, and one or more IR reflecting layers may be activated using a first flash light source provided below the substrate and one or more other IR reflecting layers may be activated using a second flash light source provided above the substrate.

In certain example embodiments, a coated article is provided. The coated article includes a glass substrate and a multilayer thin film low-emissivity coating supported by the substrate. The low-E coating includes a plurality of room temperature sputter deposited infrared reflecting layers comprising silver, with each of the IR reflecting layers being sandwiched between one or more dielectric layers, and with each of the IR reflecting layers having been activated using a two-stage treatment. The first stage in the treatment includes light source exposures with photons in flash light profiles selected to preferentially transmit energy to the IR reflecting layers based on respective absorption levels thereof, and the second stage in the treatment including exposure to temperatures in excess of 400 degrees C. following formation of the IR reflecting layers. The emissivity of the coating is 0.011 or lower.

In certain example embodiments, a system for forming a coated article is provided. A sputtering apparatus is controllable to form a multilayer thin film low-emissivity coating on a glass substrate, with the coating comprising a plurality of room temperature sputter deposited infrared reflecting layers comprising silver, and with each of the IR reflecting layers being sandwiched between one or more dielectric layers. At least one flash light source is controllable to precondition the IR reflecting layers through exposures to photons using flash light profiles selected to preferentially transmit energy to the IR reflecting layers based on respective absorption levels thereof, the flash light profiles using photon energies of 0.82-3.55 eV and being sufficient to rearrange silver atoms in the IR reflecting layers to more energetically favorable positions without also causing over-agglomeration. Emissivity of the coating is further lowerable through exposure to a subsequent thermal process.

In addition to the features of the previous paragraph, in certain example embodiments, a furnace may be configured to heat the substrate with the preconditioned IR reflecting layers thereon to a temperature of at least 400 degrees C. and reduce emissivity of the coating to 0.011 or lower.

In addition to the features of either of the two previous paragraphs, in certain example embodiments, the at least one flash light source may be controlled to operate: (a) each time one of the IR reflecting layers is deposited, directly or indirectly, on the substrate, and prior to the subsequent IR reflecting layer being deposited thereon, or (b) after all of the IR reflecting layers are deposited on the substrate, the IR reflecting layers having energy preferentially transmitted thereto from light source exposures with different flash light profiles.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a coated article including a multilayer thin film low-emissivity (low-E) coating supported by a glass substrate, the method comprising:
   forming the low-E coating on the substrate, the low-E coating including at least first and second infrared (IR) reflecting layers comprising silver, each of the first and second IR reflecting layers being sandwiched between one or more dielectric layers, the first IR reflecting layer being farther from the substrate than the second IR reflecting layer; and
   activating each of the IR reflecting layers using a two-stage treatment,
   the first stage in the treatment preconditioning the IR reflecting layers via flash light source exposure in at least first and second wavelength ranges, the first wavelength range preferentially transmitting energy to the first IR reflecting layer and the second wavelength range preferentially transmitting energy to the second IR reflecting layer, and
   the second stage in the treatment being a thermal treatment that is performed after all of the IR reflecting layers have been deposited, directly or indirectly, on the substrate, the second stage following the first stage.

2. The method of claim 1, wherein the first stage in the treatment includes photons with energies of 0.82-3.55 eV.

3. The method of claim 2, wherein the second stage in the treatment includes a temperature of 400-650 degrees C.

4. The method of claim 1, wherein the second stage in the treatment includes a temperature of 400-650 degrees C.

5. The method of claim 1, wherein the emissivity of the coating, following the two-stage treatment, is 0.011 or lower.

6. The method of claim 1, wherein:
   first and second seed layers are provided below and contacting the first and second IR reflecting layers, respectively; and
   first and second capping layers are provided over and contacting the first and second IR reflecting layers, respectively.

7. The method of claim 6, wherein:
   photons in the first wavelength range preferentially transmit energy to the first seed layer, the first IR reflecting layer, and/or the first capping layer; and
   photons in the second wavelength range preferentially transmit energy to the second seed layer, the second IR reflecting layer, and/or the second capping layer.

8. The method of claim 6, wherein:
   light energy in the first wavelength range is preferentially absorbed by the first seed layer and/or the first capping layer, and is delivered via acoustic photons to the first IR reflecting layer; and
   light energy in the second wavelength range is preferentially absorbed by the second seed layer and/or the capping layer, and is delivered via acoustic photons to the second IR reflecting layer.

9. The method of claim 6, wherein the first and second seed layers each comprise Zn and the first and second capping layers each comprise Ni, Ti, and/or Cr.

10. The method of claim 1, wherein:
    the preconditioning includes rearranging silver atoms in the first and second IR reflecting layers to more energetically favorable positions; and
    the thermal treatment aligns chemical potentials of at least some layers in the layer stack and further densities the preconditioned first and second IR reflecting layers.

11. The method of claim 1, wherein the first stage is performed each time one of the IR reflecting layers is deposited, directly or indirectly, on the substrate, and prior to the subsequent IR reflecting layer being deposited.

12. The method of claim 11, wherein the first and second wavelength ranges are the same.

13. The method of claim 11, wherein the preconditioning of each of the IR reflecting layers is performed after the respective IR reflecting layer is covered with the one or more dielectric layers.

14. The method of claim 1, wherein the first stage is performed after all of the IR reflecting layers are deposited, the first and second wavelength ranges being different from one another.

15. The method of claim 14, wherein the first wavelength range has a maximum intensity in a first area proximate to a maximum absorptivity of the first IR reflecting layer and the second wavelength range has a maximum intensity in a second area that is remote from the first area and where the absorptivity of the first IR reflecting layer is less than one-half of its maximum.

16. The method of claim 14, wherein the first wavelength range has a maximum intensity in the 700-900 nm spectral range and the second wavelength range has a maximum intensity in the 600-700 nm spectral range.

17. The method of claim 14, wherein:
    the low-E further includes a third IR reflecting layer comprising silver, the third IR reflecting layer also being sandwiched between one or more dielectric layers, the third IR reflecting layer being farther from the substrate than the first IR reflecting layer, and
    the first stage further includes flash light source exposure with a third wavelength range that preferentially transmits energy to the third IR reflecting layer.

18. The method of claim 17, wherein the first, second, and third wavelength ranges are all different from one another and have respective maximum intensities in the 600-700 nm, 400-600 nm, and 700-900 nm spectral ranges.

19. The method of claim 14, wherein the flash light source exposures that generate the first and second wavelength ranges are formed by time-separated sub-pulses of different waveforms.

20. The method of claim 14, wherein the flash light source exposures that generate the first and second wavelength ranges are formed by different flash bulbs.

21. The method of claim 1, wherein the first stage is performed after all of the IR reflecting layers are deposited, and wherein the first IR reflecting layer is preconditioned using a first light source provided over the substrate and the second IR reflecting layer is preconditioned using a second light source provided under the substrate.

22. The method of claim 1, wherein the low-E coating is formed in whole or in part by room temperature sputtering.

* * * * *